United States Patent [19]
Shishido et al.

[11] Patent Number: 4,905,605
[45] Date of Patent: Mar. 6, 1990

[54] CONVEYOR TROLLEY

[75] Inventors: Tsuneo Shishido; Tatsuya Sakagami; Yasuaki Abe; Masao Arai; Kazuysohi Fukuhara; Yasuhide Kido, all of Osaka, Japan

[73] Assignee: Daifuku Co., Ltd., Osaka, Japan

[21] Appl. No.: 203,692

[22] Filed: Jun. 7, 1988

[30] Foreign Application Priority Data

Dec. 26, 1987 [JP] Japan .............................. 62-197943[U]
Dec. 26, 1987 [JP] Japan .............................. 62-197945[U]
Dec. 26, 1987 [JP] Japan .............................. 62-197946[U]
Dec. 26, 1987 [JP] Japan .............................. 62-197947[U]
Dec. 26, 1987 [JP] Japan .............................. 62-197948[U]

[51] Int. Cl.$^4$ .............................................. B61B 3/02
[52] U.S. Cl. ...................................... 104/93; 104/110; 105/130; 301/115
[58] Field of Search ................ 301/9 DH, 9 DN, 111, 301/114, 115, 117; 295/43; 104/89, 93, 106, 110; 105/97, 108, 130, 150; 192/95, 114 R, 93 R, 95, 99 S, 67 R

[56] References Cited

U.S. PATENT DOCUMENTS

| | | | |
|---|---|---|---|
| 1,371,212 | 3/1921 | Adams et al. | 301/9 DN |
| 3,603,175 | 9/1971 | Horton | 192/114 X |
| 3,625,158 | 12/1971 | Lorenz et al. | 104/110 X |
| 3,855,941 | 12/1974 | Fromme et al. | 105/150 |
| 4,393,785 | 7/1983 | Hortnagel | 104/110 |
| 4,423,685 | 1/1984 | Kerckhoff | 104/93 X |
| 4,480,157 | 10/1984 | Ishikura et al. | 104/93 X |
| 4,531,460 | 7/1985 | Pamer | 104/93 X |
| 4,545,303 | 10/1985 | Fujita et al. | 104/93 |
| 4,630,544 | 12/1986 | Hecht et al. | 105/130 |

FOREIGN PATENT DOCUMENTS 2516420 4/1976 Fed. Rep. of Germany ........ 104/93
3521013 12/1976 Fed. Rep. of Germany ........ 104/93

Primary Examiner—Margaret A. Focarino
Assistant Examiner—Joseph D. Pape
Attorney, Agent, or Firm—Webb, Burden, Ziesenheim & Webb

[57] ABSTRACT

A conveyor trolley with a pair of wheels rolling on a flat upper face of an upper end rail portion of a guide rail, one wheel acting as a drive wheel and attached to an output shaft of a speed-reducing unit mounted on a trolley body movably supported on the guide rail, and a motor for driving the output shaft via a speed-reducing mechanism in the speed-reducing unit, the trolley having a collector unit for supplying power to and communicating control signals with the motor, guide rollers for laterally binding and positioning the upper rail portion and a lower rail portion of the guide rail, a wheel securing unit disposed between an annular concave portion defined in a boss of the drive wheel and the output shaft, the wheel securing unit including an outer ring, an inner ring having a wedge-shaped cross section to be engaged into the outer ring and a tightening member for securing the wheels to the output shaft by reducing an inner diameter of the inner ring and by enlarging an outer diameter of the outer ring, the trolley further having a clutch removably disposed between the output shaft of the speed-reducing unit and a final rotary member of the speed-reducing unit loosely mounted on the output shaft and an operational lever attached to the clutch for engaging and disengaging the same.

8 Claims, 9 Drawing Sheets

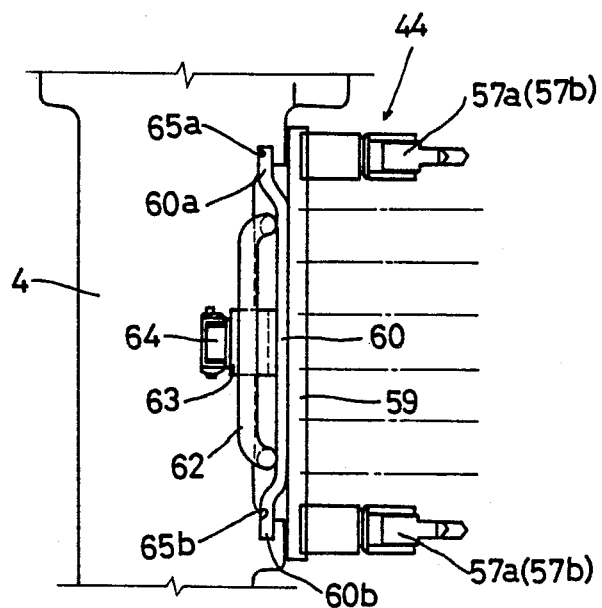
FIG·10
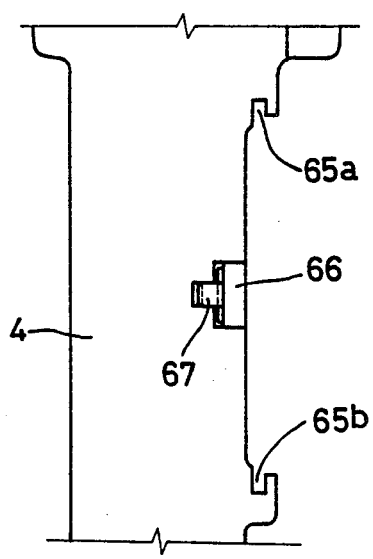
FIG·11

FIG·12
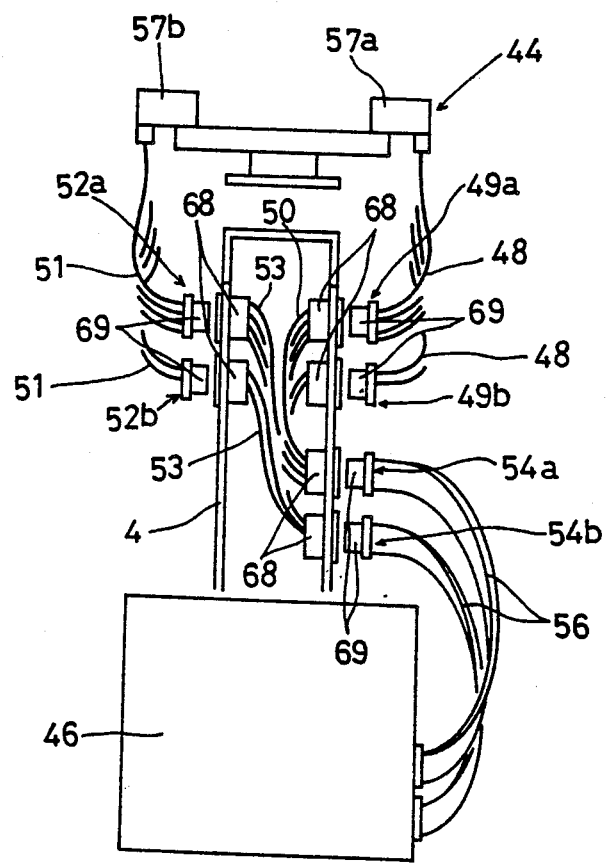

FIG·13
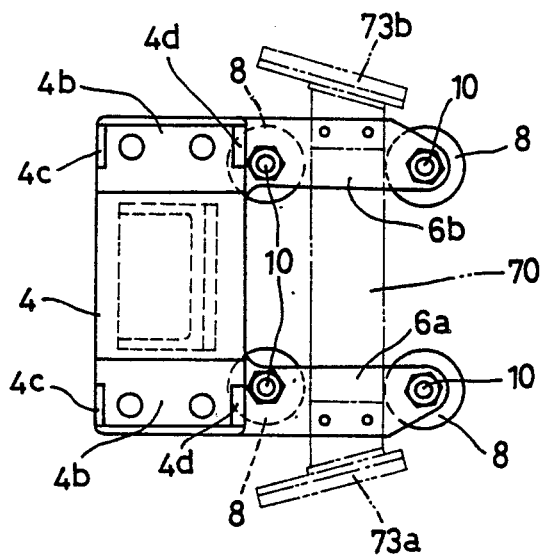
FIG·14
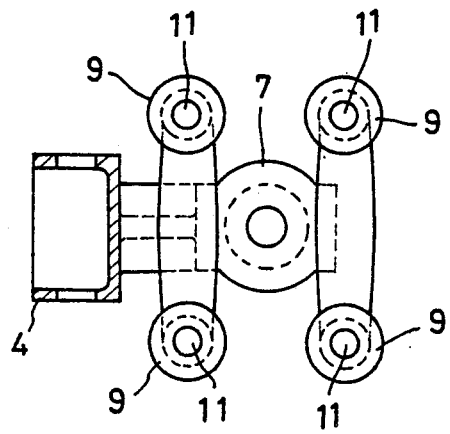

CONVEYOR TROLLEY

BACKGROUND OF THE INVENTION

1. FIELD OF THE INVENTION

The present invention relates to a conveyor trolley comprising a pair of wheels rolling over a flat upper face of an upper end rail portion of a guide rail with one wheel acting as a drive wheel attached to an output shaft of a speed-reducing unit mounted in a trolley body and a motor for driving the output shaft via a speed-reducing mechanism in the speed-reducing unit.

2. DESCRIPTION OF THE PRIOR ART

The conveyor trolley of the above-noted type is used as a trolley constituting an electric cart for conveying an object or as a trolley of a tractor electric cart for tracting a cart for conveying an object. In such trolley, it is known to employ a motor having a so-called negative brake such that when power supply is stopped to stop the motor the brake is automatically activated to stop the drive wheel thereby stopping the trolley on a guide rail. For manually moving the trolley, a brake release lever attached to the motor with the brake to release a rotary shaft of the motor from the transmission. However, a speed-reducing mechanism having a considerably large speed reduction ratio provided between the rotary shaft of the motor and an output shaft of the speed-reducing unit provides too great a resistance for the worker to smoothly and easily push the trolley at a convenient speed.

Further, in the trolley of the above-described type, the wheel rolling on the guide rail is attached to the shaft by means of a key or a spline connection. And, for preventing inadvertent disengagement of this wheel in its axial direction, an inner end of a lock bolt screwedly extending radially through a boss of this wheel is placed in pressurized contact with the peripheral face of the shaft, or a wheel-retentive plate is fixed by means of a screw to an outer end of the shaft.

However, if a wheel having a flat peripheral face rolling on the flat upper face of the guide rail is used in place of a wheel having a groove for engaging the upper end portion of the guide rail, when the trolley travels at a horizontal curved passage having its center of arc at the side of the trolley body relative to the guide rail, the wheel is subjected to a very large thrust force in a direction for disengaging the wheel from the shaft. Therefore, with such wheel securing means as described above, there is a danger of the wheel inadvertently disengaging from the shaft as the secured engagement between the wheel and the shaft is gradually loosened because of the thrust force acting on the engagement repeatedly.

SUMMARY OF THE INVENTION

In view of the above-noted state of the art, it is the primary object of the present invention to provide a conveyor trolley capable of solving the above drawbacks of the prior art, and more particularly to provide an improved conveyor trolley which may be easily moved by a worker even if the trolley has a speed reduction mechanism having a large speed reduction ratio, and which provides a safe and reliable travelling performance because there is no danger of inadvertent disengagement of the wheel from the shaft even with repeated travellings at the horizontal curved passage, and further which provides an easy maintenance.

In order to achieve this object, a conveyor trolley related to the present invention having a pair of wheels rolling on a flat upper face of an upper end rail portion of a guide rail, one wheel acting as a drive wheel and attached to an output shaft of a speed-reducing unit mounted on a trolley body movably supported on the guide rail, and a motor for driving the output shaft via a speed-reducing mechanism in the speed-reducing unit, the conveyor trolley comprising a collector unit for supplying power to and communicating control signals with the motor, guide rollers for lateraly binding and positioning the upper rail portion and a lower rail portion of the guide rail, wheel securing means disposed between an annular concave portion defined in a boss of the wheels and the shafts, the wheel securing means including an outer ring, an inner ring having a wedge-shaped cross section to be engaged into the outer ring, a tightening member for securing the wheels to the output shaft by reducing an inner diameter of the inner ring and by enlarging an outer diameter of the outer ring, a clutch removably disposed between the output shaft of the speed-reducing unit and a final rotary member of the speed-reducing unit loosely mounted on the output shaft and an operational lever attached to the clutch for engaging and disengaging the same.

With the above construction, the clutch is disposed between the output shaft of the speed-reducing unit and a final rotary member (a large flat gear 23 in the embodiment) of the speed-reducing unit loosely mounted on the output shafts and there is also provided the operational lever attached to the clutch for engaging and disengaging the same. Because of these features, for manually pushing the trolley, the clutch is disengaged to release the output shaft from the speed-reducing mechanism, whereby the manual trolley pushing operation is greatly facilitated even when the speed-reducing mechanism has a large speed-reducing ratio. Accordingly, the worker may readily push the trolley even at a walking speed.

Further, according to a preferred embodiment of the present invention, there is provided clutch locking means for locking the clutch at an engaged or disengaged position thereof. With this clutch locking means, no spring is necessary for holding the clutch engagement. Thus, there is no possibility that aging of the spring causes the clutch to be inadvertently disengaged thereby making it impossible to drive the drive wheel. Moreover, in manually pushing the trolley, there is no necessity of the worker's maintaining the clutch at the disengaged position thereof by his hand, whereby work effeciency will also improve.

Further, since the wheel has a flat circumference so as to roll over a flat upper face of the upper rail portion of the guide rail, the construction of the present invention is less expensive than that of the prior art in which the upper end face of the guide rail and the wheel circumference need have special cross sections. Also, there will occur less uneven wear in the guide rail upper portion and there are further provided guide rollers for laterally binding and positioning the upper and lower rail portions of the guide rail. As the result, the trolley may always reliably and smoothly travel along the guide rail without being laterally swung thereon.

According to a further characterizing feature of the present invention, the wheel is secured to the shaft not by a key or a spline but by wheel securing means having outer and inner rings respectively in pressed contact with an inner periphery of a wheel boss and a circumference of the shaft. With this feature, even if the trolley repeatedly travels on a horizontal curved passage, there is no danger of the wheel inadvertently disengaging therefrom, whereby the safety of the trolley is further improved.

Other and further advantages and effects of the present invention will become more apparent from the following description of the embodiments with reference to the accompanying drawings.

BRIEF DESCRIPTION OF THE DRAWINGS

FIG. 10 is a front view showing the attaching construction for the collector unit, FIG. 11 is a front view showing the attaching portion of the collector unit in the trolley body, FIG. 12 is a developed view showing a line-connecting construction between the collector unit and a control panel, FIG. 13 is a front view of the trolley body, and FIG. 14 is a sectional front view of the trolley body.

DESCRIPTION OF THE PREFERRED EMBODIMENT

A preferred embodiment of the present invention will be particularly described hereinafter with reference to the accompanying drawings.

FIGS. 1 through 14 show a conveyor trolley related to the present invention.

Figure 1:
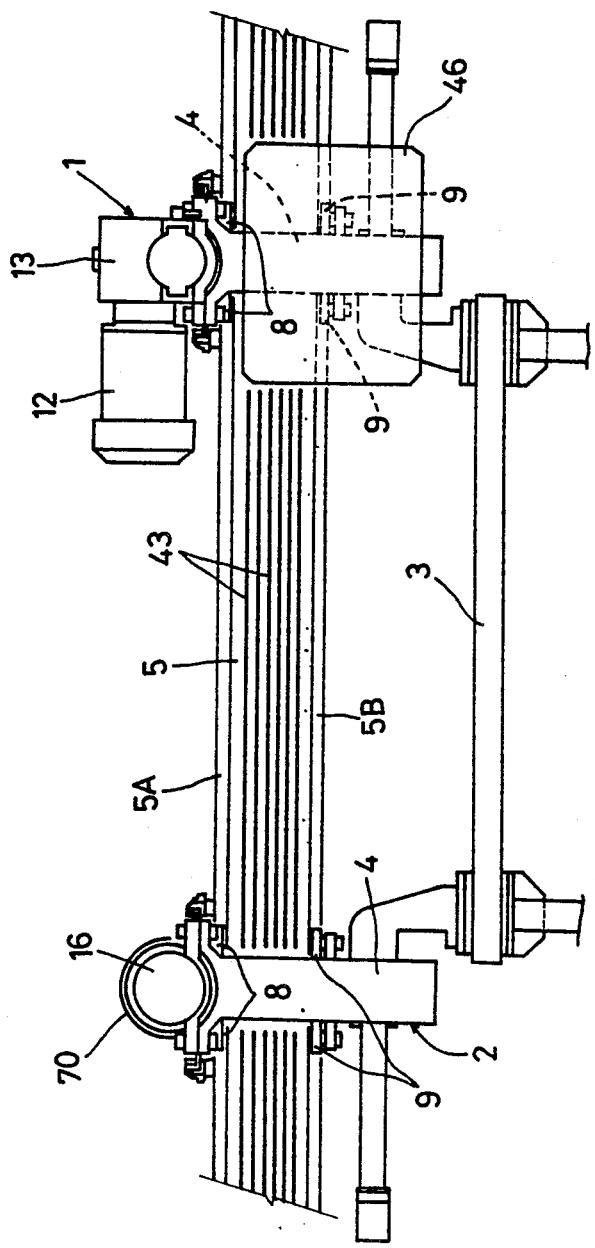
FIG. 1 is a side view showing the overall conveyor electric cart.
Figure 2:
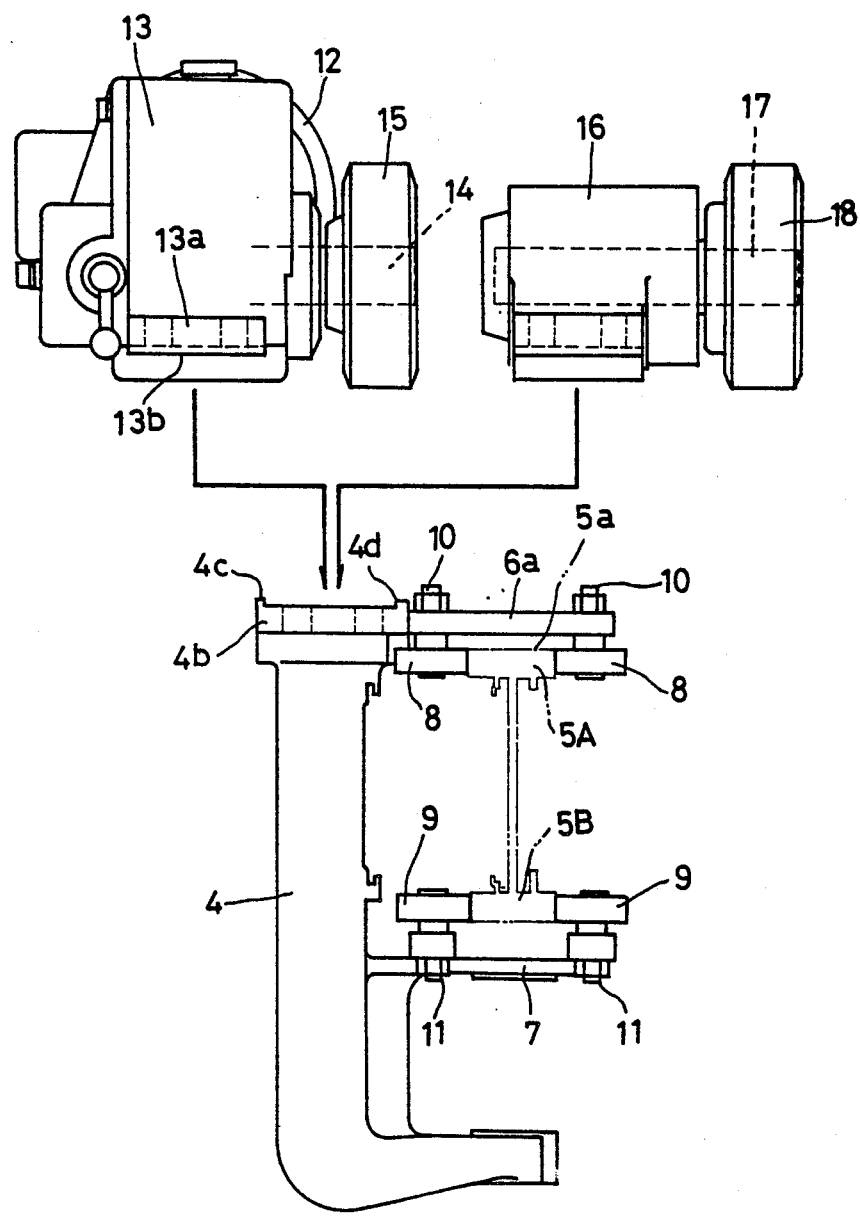
FIG. 2 is an exploded front view of main portions of a power trolley and of a free trolley.

Referring to FIG. 1, a reference numeral 1 denotes a power trolley, a numeral 2 denotes a free trolley, a numeral 3 denotes a connecting member for interconnecting trolley bodies 4 of the trollies 1 and 2. This connecting member 3 downwardly includes a hanger (not shown) for suspending therefrom an object to be conveyed. As shown in FIG. 2 also, the trolley body 4 of the power trolley 1 positioned at one side of a guide rail 5 includes a front and rear pair of arms 6a and 6b extending over the guide rail 5 and an arm 7 extending under the guide rail 5. The arms 6a and 6b rotatably support via vertical support shafts 10 positioning guide rollers 8 for laterally binding the upper rail portion 5A at front and rear portions thereof. The arm 7 rotatably supports via vertical support shafts 11 positioning guide rollers 9 for laterally binding the lower rail portion 5B at front and rear portions thereof. The trolley body 4 continuously forms at an upper end thereof a front and rear pair of support seats 4b.

On the support seats 4b, there is dismountably mounted via bolt-nuts 38 a speed-reducing unit 13 through a front and rear pair of mount seats 13a thereof.

More particularly, the mount seats 13a downwardly form at front and rear ends thereof projections 13b and 13c which engage the front and rear ends of the support seats 4b. On the other hand, the support seats 4b upwardly form at right and left sides thereof projections 4c and 4d engage the front and rear ends of the mount seats 13a. Accordingly, the speed-reducing unit 13 is securely positioned in the lateral and longitudinal directions thereof on the horizontal faces of the support seats 4b.

At a rear side of the speed-reducing unit 13, there is connected a motor 12 in parallel with the travelling direction. This motor 12 drives an output shaft 14 extending horizontally from the speed-reducing unit 13 to the upper side of the guide rail 5. The output shaft 14 carries a drive wheel 15 rolling on a flat upper face of the upper rail portion 5A of the guide rail 5.

The trolley body 4 constituting the free trolley 2 has the same construction as the trolley body 4 of the power trolley except that the former dismountably mounts via bolts on an upper end thereof a bearing unit 16. A rotary shaft 17 supported by this bearing unit 16 and upwardly projecting canti-lever wise towards the guide rail 5 carries a driven wheel 18 rolling on a flat upper face of the upper rail portion 5A.

Figure 3:
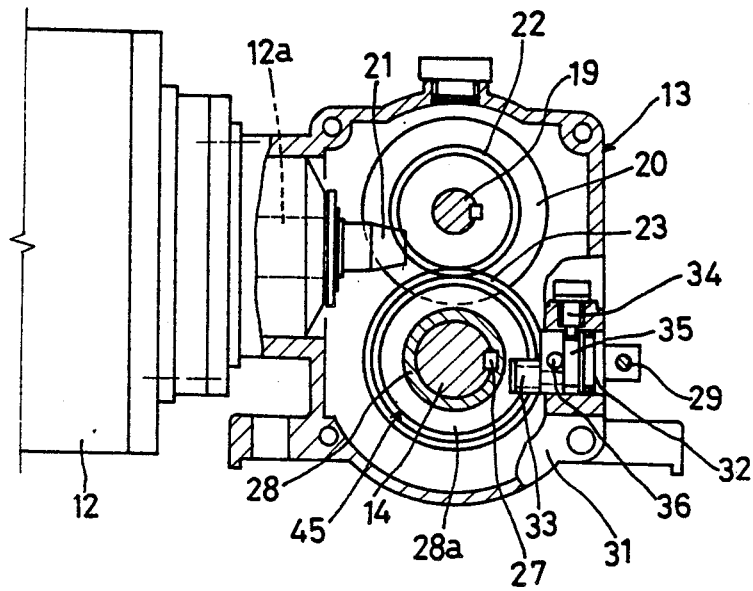
FIG. 3 is a vertically sectional side view showing an inner construction of a speed-reducing unit.
Figure 4:
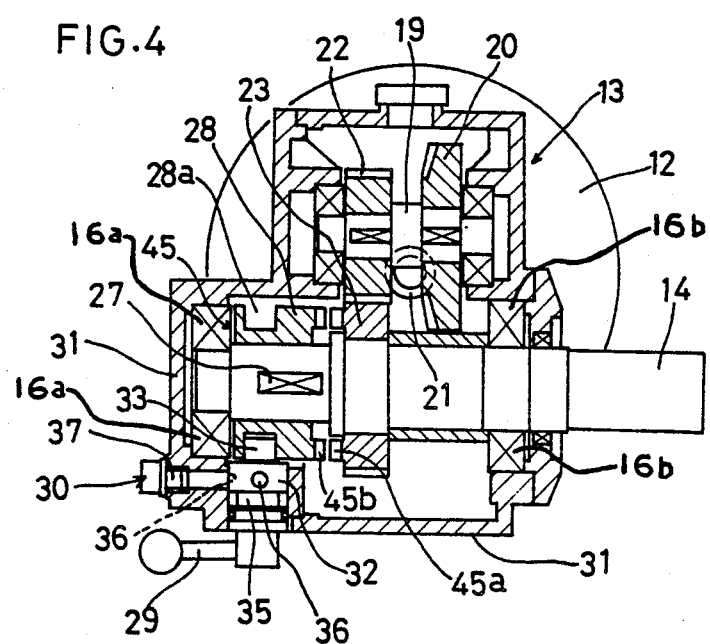
FIG. 4 is a vertically sectional front view of the inner construction of the speed-reducing unit with a clutch operational lever portion being shown in its development.

As shown in FIG. 3 and FIG. 4, the speed-reducing unit 13 supports therein an input shaft 19 disposed in parallel with an output shaft 14. This input shaft 19 fixedly carries a large bevel gear 20 meshing with a small bevel gear 21 attached to a leading end of a rotary shaft 12a of the motor 12. The input shaft 19 also fixedly carries a small flat gear 22 meshing with a large flat gear 23 rotatably mounted on the output shaft 14. Between the large flat gear 23 and the output shaft 14, there is interposed a clutch 45.

As shown in FIG. 4, a first and a second bearing 16a and 16b, rotatably support the output shaft 14 from opposing sides of the final rotary member 23 of the speed reducing unit 13 and the clutch 45.

This clutch 45 includes a clutch claw 45a projected from a side face of the large flat gear 23 and a clutch claw 45b engageable with and disengageable from the clutch claw 45a, and the clutch 45 further includes a clutching movable member 28 slidably engaging via a key 27 with the output shaft 14 in an axial direction thereof. Further, the clutch 45 still further includes an operational lever for engaging and disengaging the same and clutch locking means 30. The operational lever 29 is connected to an outer end of a rotary shaft 32 supported by a speed-reducing unit casing 31 in a direction normal to the output shaft 14. The rotary shaft 32 supports at an inner end thereof a roller 33 engaging a circumferential groove 28a of the clutching movable member 28. A reference numeral 34 denotes a bolt screwedly attached to the casing 31 and operative to securely position the rotary shaft 32 with a leading end of the bolt engaging a circumferential groove 35 of the rotary shaft 32. The clutch locking means 30 includes a pair of concave portions 36 circumferentially defined with an appropriate distance therebetween in a circumference of the rotary shaft 32 and a locking bolt 37 screwedly fitted to the casing 31 with a leading edge of the bolt 37 being selectively fitted into the pair of concave portions 36.

FIG. 4 shows a condition in which the clutch 45 is disengaged thereby disengaging the output shaft 14 from the large flat gear 23. For obtaining this condition, the locking bolt 37 is released from the concave portion 36 and the operational lever 29 is pivoted by 90 degrees from its vertical position to its horizontal position to eccentrically rotate the rollers 33. Then, the clutching movable member 28 is moved by the amount equivalent to the eccentric rotation in the direction away from the large flat gear 23 thereby disengaging the clutch claw 45b from the clutch claw 45a of the large flat gear 23, whereby the output shaft 14 is disengaged from the large flat gear 23. In this condition, since one of the concave portions 36 of the rotary shaft 32 is placed in opposition to the leading end of the locking bolt 37, if the locking bolt 37 is tightened to cause its leading edge to be pressed into the concave portion 36, the rotary shaft 32 is fixed and the clutch 45 is locked at this disengaged position. In this condition, the operative connection between the output shaft 14 and the speed-reducing unit including the small bevel gear 21, the large bevel gear 20, the small flat gear 22 and the large flat gear 23 is broken. Also, since the drive wheel 15 is freely rotatable with the output shaft 14, the conveyor electric cart including the power trolley 1, the free trolley 2, the connecting member 3 and so on may be manually moved smoothly and easily along the guide rail 5.

When the above manual pushing operation of the cart is completed, the locking bolt 37 is released from the concave portion 36 and the operational lever 29 is reversely pivoted by 90 degrees from the horizontal position to the vertical position thereby causing the roller 33 to eccentrially rotate in the reverse direction. Then, the clutching movable member 28 is moved by the amount equivalent to the eccentric rotation in the direction towards the large flat gear 23 thereby engaging the clutch claw 45b with the clutch claw 45a of the large flat gear 23, whereby the output shaft 14 is again engaged with the large flat gear 23. In this condition, since the other of the concave portions 36 of the rotary shaft 32 is placed in opposition to the leading end of the locking bolt 37, if the locking bolt 37 is tightened to cause its leading edge to be pressed into the concave portion 36, the rotary shaft 32 is fixed and the clutch 45 is locked at this engaged position. In this condition, the output shaft 14 is operatively connected via the speed-reducing unit including the small bevel gear 21, the large bevel gear 20, the small flat gear 22 and the large flat gear 23 to the rotary shaft 12a of the motor 12. Therefore, by activating this motor 12, the drive wheel 15 may be rotated at a predetermined speed via the speed-reducing unit and the output shaft 14, whereby the conveyor cart may travel along the guide rail 5.

Figure 5:
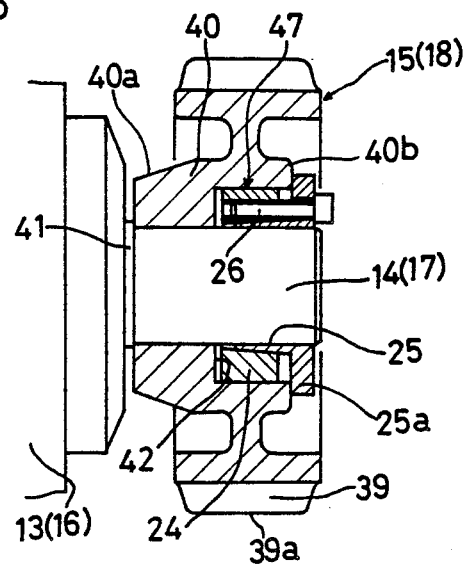
FIG. 5 is a vertically sectional front view showing an attaching constuction of a wheel.

On the other hand, as shown in FIG. 5, the wheels 15 and 18 respectively mount a tire portion 39 having a flat circumference 39a. A boss portion 40 forms, in its outer end portion 40b opposed to its inner end portion 40a contacting a wheel positioning large diameter portion 41 of the shafts 14 and 17, an annular concave portion 42 having a diameter sufficiently larger than those of the shafts 14 and 17. Between this annular concave portion 42 and the shafts 14, 17, there is provided wheel securing means 47. It is preferable that this annular concave portion 42 be as deep as possible in the width direction of the wheel 15, 18. This wheel securing means 47 includes an outer ring 24 fitted into the annular concave portion 42, an inner ring 25 having a wedge-like cross section to be fitted into the outer ring 24 and a plurality of tightening bolts 26 disposed in the peripheral direction to axially extend an outer flange portion 25a of the inner ring 25 to be screwedly engaged into the outer ring 24. Also, the outer ring 24 and the inner ring 25 forms a plurality of split grooves interposed in the peripheral direction such that the rings 24 and 25 may vary in their diameters.

In place of the plurality of tightening bolts 26, only one tightening bolt 26 may be used. However, for more reliable and firm securing of the wheel to the shaft and also for advantageously dispersing the pressure applied from the wheel to the shaft, it is preferable to use a plurality of tightening bolts 26 interspaced about the outer flange portion 25a of the inner ring. Especially, the above arrangement will help extend the usable life of the boss 40 of the wheel in case this boss is formed of a resin.

Nextly, the mounting operations of the wheels 15 and 18 will be described. The shafts 14 and 17 are fitted into the boss portions 40 of the wheels 15 and 18. The inner end portions 40a are placed into contact with the wheel positioning large diameter portions 41 of the shafts 14 and 17 thereby fixedly positioning the wheels 15 and 18. Then, the wheel securing means 47 is engaged between the annular concave portion 42 and the shafts 14, 17 with the flange portion 25a of the inner ring 25 being placed into contact with the outer end portion 40b of the boss portion 40. Thereafter, the tightening bolts 26 are tightened thereby axially pressing the inner ring 25 into the outer ring 24, whereby the inner ring 25 is reduced in its diameter and placed in urged contact with the outer peripheries of the shafts 14 and 17 and at the same time the outer ring 24 is enlarged in its diameter and placed in urged contact with the inner peripheral face of the annular concave portion 42 of the boss portion. As the result, the wheels 15 and 18 are completely fixed to the shafts 14 and 17 with regard to its peripheral and axial directions.

The conveyor cart having the above-described construction, i.e. the construction constituted by the power trolley 1, the free trolley 2, the connecting member 3 and so on, may travel along the guide rail 5 with the drive wheel 15 being rotated by the output shaft 14 of the speed-reducing unit 13 driven by the motor 12. Even when the cart travels at a horizontal curved passage portion where a thrust force acts on the wheels 15 and 18 to urge the same to disengage from the shafts 14 and 17, since the wheels 15 and 18 are firmly secured by the wheel securing means 47 to the shafts 14 and 17; thus, the wheels 15 and 18 will not inadvertently disengage from the shafts 14 and 17 even if the shafts attach at ends thereof no wheel stop plates.

Figure 6:
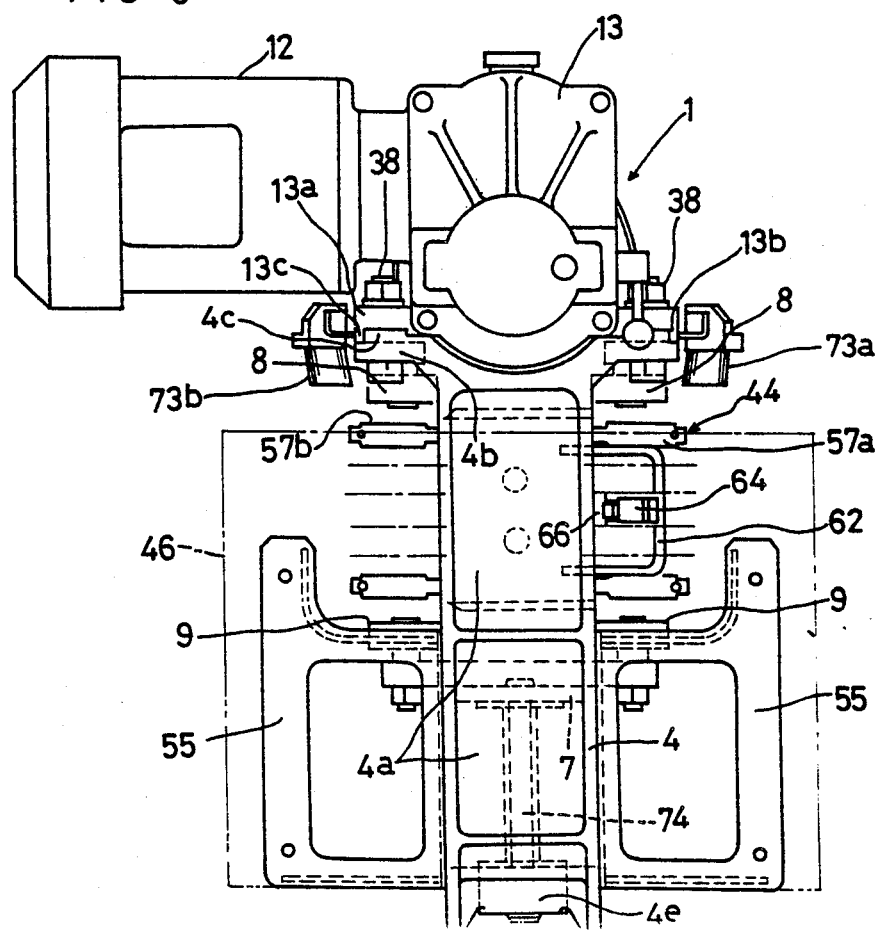
FIG. 6 is a partially cutoff side view of the power trolley.
Figure 7:
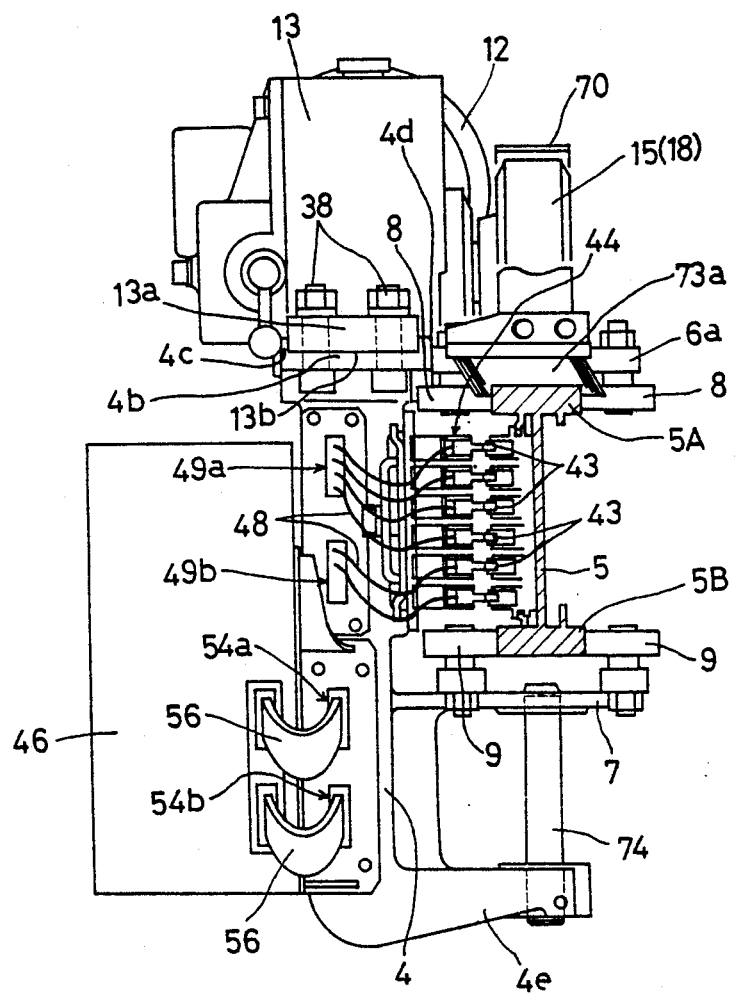
FIG. 7 is a front view of the power trolley.

On the other hand, as shown in FIG. 6 and FIG. 7, at a side of the trolley body 4 of the guide rail 5, there are provided a plurality of power supply and control signal lines 43 along the longitudinal direction of the rail. Also, the trolley body 4 of the power trolley 1 mounts therein a collector unit 44 to come into sliding contact with the respective power supply and control signal lines 43. Further, to the outside of this trolley body 4, there is attached a control panel 46 through a right and left pair of brackets 55.

The trolley body 4 has a hook-shaped cross section with its concave portion 4a being defined in its outer face and the concave portion 4a is covered with the control panel 46.

A reference numeral 74, it is to be noted here, denotes a vertical pin for laterally pivotably connecting the connecting end portions of the connecting member 3 between a lower end bent portion 4e of the trolley body 4 and the arm 7.

Figure 8:
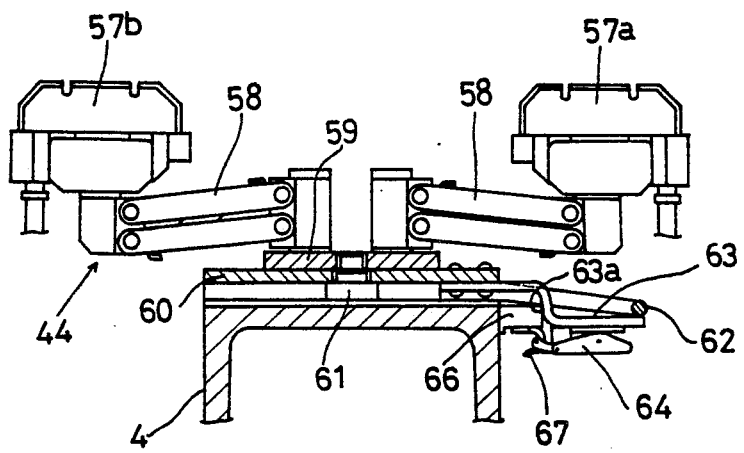
FIG. 8 is a sectional front view showing an attaching construction for a collector unit.
Figure 9:
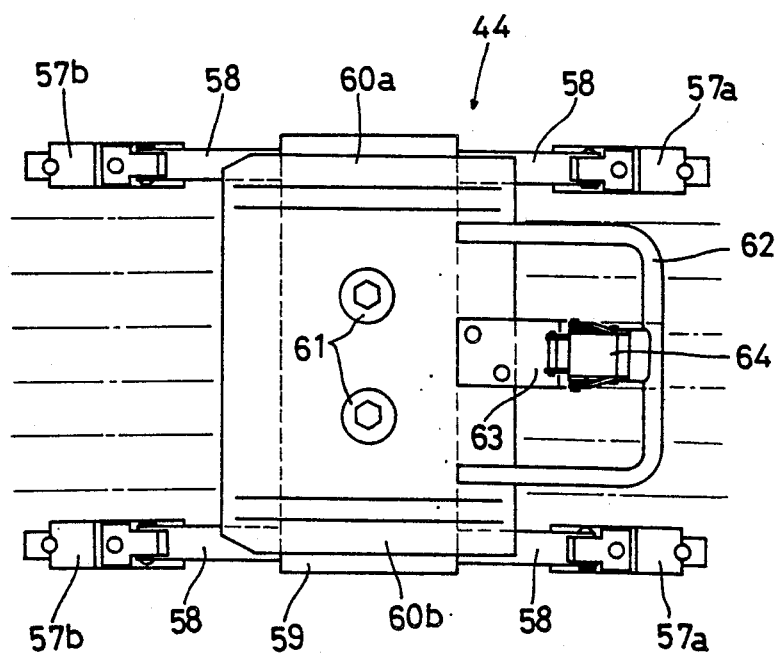
FIG. 9 is a side view of the collector unit.

The collector unit 44, as shown in FIGS. 8 through 10, include a front and rear pair of collector elements 57a and 57b for the respective power supply and control signal lines 43. These collector elements 57a and 57b are attached to a base plate 59 to be translatable via a parallel link 58 with respect to the power supply and control signal lines 43 in the known manner and at the same time the collector elements are urged by means of springs attached to the parallel link 58 to be placed into urged contact with the power supply and control signal lines 43. To the outer side of the base plate 59, there is attached a guide plate 60 via an upper and lower pair of bolts 61. Further, this guide plate 60 carries at a front end thereof a handle 62 having a hook-shaped cross section. To the outer face of a stopper plate 63 connecting between a central portion of the handle 62 and the guide plate 60, there is provided a stopper member 24.

On the other hand, as shown in FIG. 10 and FIG. 11, inside the trolley body 4 mounting the collector unit 44, there are provided an upper and lower pair of engaging grooves 65a and 65b slidably engaging upper and lower side portions 60a and 60b of the guide plate 60 in the longitudinal direction of the guide rail 5 and there is also provided a stopper 66 contacting a stepped face 63a of the stopper plate 63 when the guide plate 60 is inserted into the engaging grooves 65a and 65b to a predetermined position. Further, the stopper 66 attaches a member to be stopped 67 which is freely engageable with and disengageable from the stopper member 64.

As shown in FIG. 7 and FIG. 12, the line 48 connected with the collector element 57a at the front side of the collector unit 44 is connected via first insertion type line connector means 49a and 49b attached to a front portion of the trolley 4 of the power trolley 1 to a relay line 50 provided inside the concave portion 4a of the trolley body 4. On the other hand, the line 51 connected with the collector element 47b at the rear side of the collector unit 44 is connected via first insertion type line connector means 52a and 52b attached to a rear portion of the trolley 4 to a relay line 53 provided inside the concave portion 4a of the trolley body 4. The relay lines 50 and 53 are connected via second insertion type line connector means 54a and 54b to respective lines inside a multicore cable 56 extending from the control panel 46.

The first and second insertion type line connector means 49a, 49b, 52a, 52b, 54a and 54b respectively comprise an outlet 68 fixed to the trolley body 4 and a plug 69 which is insertable into the outlet 68. Also, the front and rear pair of collector elements 47a and 47b to come into sliding contact with the same power supply and control signal lines are consequently connected to a terminal of the outlet 68 of the second insertion type line connector means 54a and 54b.

The power supply to and communication of control signals to and from the motor 12 are effected through the power supply and control signal lines 43, the respective collector elements 47a and 47b of the collector unit 44, the lines 48 and 51, the first insertion type line connector means 49a, 49b, 52a and 52b, the relay lines 50 and 53 inside the trolley body 4, the second insertion type line connector means 54a and 54b, the lines inside the multicore cable 56 and through the control panel 46. As the result, when the motor 12 is thus activated to drive the output shaft of the speed-reducing unit 13 thereby rotating the drive wheel 15, the conveyor cart constituted by the power trolley 1, the free trolley 2, the connecting member 3 and so on may be travelled along the guide rail 5.

For carring out checking and maintenance operations of the collector elements 47a and 47b, the plugs 69 of the first insertion type line connector means 49a, 49b, 52a and 52b are disconnected from the corresponding outlets 68 thereby disconnecting the lines 48 and 51 of the collector unit 44 from the relay lines 50 and 53 inside the trolley body 4. Also, as shown in FIG. 8, after the stopper member 64 is disengaged from the member 67 of the trolley 4, the guide plate 60 is forwardly withdrawn through the handle 62 from the engaging grooves 65a and 65b of the trolley body 4, whereby the collector unit 44 constituted by the guide plate 60, the base plate 59 and the collector elements 57a and 57b may be detached from the trolley body 4.

After the above checking or maintenance operation, for re-attaching the collector unit 44 to the trolley body 4 of the power trolley 1, the upper and lower portions 60a and 60b of the guide plate 60 are inserted into the engaging grooves 65a and 65b of the trolley body 4, and as shown in FIG. 8, by engaging the stopper member 64 with the member 67 with the stepped face 63a of the stopper plate 63 being placed in contact with the stopper 66, the collector unit 44 may be securedly fixed to the trolley body 4 at a predetermined position. Thereafter, the disconnected plugs 69 of the lines 48 and 51 of the first insertion type line connector means 49a, 49b, 52a and 52b are again connected with the corresponding outlets 68.

Also, for carrying out a checking or maintenance operation of the control panel 46, the plugs 69 of the multicore cable 56 of the second insertion type line connector means 54a and 54b are disconnected from the outlets 68 corresponding thereto and then the control panel 46 may be detached from the bracket 55 of the trolley body 4. That is to say, when the power trolley 1 is transported from a factory to a user's work site, it is possible to temporarily detach the collector unit 44 and the control panel 46, which are vulnerable to external shocks or vibrations, from the trolley body 4, and then after the trolley body 4 is supported by the guide rail 5, the collector unit 44 and the control panel 46 may be again attached to the trolley body 4.

The attaching position of the control panel 46, the attaching construction of the collector unit 44 or the like are not limited to those disclosed in the above embodiment. However, it is preferrable that the control panel 46 be attached to the outside of the trolley body 4 as in the previous embodiment.

Also, the wiring construction between the collector unit 44 and the control panel 46 or the detaching position of the lines extending from the collector unit 44 is not limited to those disclosed in the previous embodiment.

Moreover, any stopper member may be use for securing the collector unit 44 inserted into the predetermined position. For example, the stopper member may be constructed such that the member automatically stops the collector unit 44 with the insertion of the same and releases the unit 44 manually.

Further, it is also possible to extend lines from the front and rear sides of the control panel 46 and to connect the same via the further insertion type line connector means with the relay lines in the trolley body at the front and rear sides of the trolley body.

Further, as shown in FIG. 13 and in FIG. 14, in both of the power trolley 1 and the free trolley 2, both ends of a wheel cover 70 for covering the drive wheel 15 and the driven wheel 18 are detachably attached by means of bolts to the front and rear pair of arms 6a and 6b extending from the upper end of the trolley body 4. To forward and rearward ends of this wheel cover 70, there are attached, diagonally to the longitudinal direction of the guide rail 5, cleaning brushes 73a and 73b operative to clean the upper face of the upper rail portion 5A of the guide rail in the course of travelling by coming into sliding contact with the same.

For carrying out a replacement of the drive wheel 15 of the power trolley 1 or a checking or maintenance operation of the speed-reducing unit 13 or of the motor 12, the trolley body 4 is lifted and a spacer having a thickness appropriate to slightly lift the arms 6a and 6b is inserted between the front and rear pair of arms 6a and 6b extending from the trolley body 4 above the guide rail 5 and the upper rail portion 5A of the guide rail 5. Then, the bolt and nuts 38 are released and removed, the mount seat 13a of the speed-reducing unit 13 is lifted from the upper support seats 4b of the trolley body 4 and then the speed-reducing unit 13 togetherwith the motor 12 and the drive wheel 15 is dismounted from the trolley body 4. Needless to say, for a replacement of the driven wheel 18 of the free trolley 2 and a checking or maintenance operation of the bearing unit 16 of the same may be carried out in the same manner as the bearing unit 16 togetherwith the driven wheel 18 may be dismounted from the trolley body 4. Also, in either case, if necessary, the wheel cover 70 togetherwith the cleaning brushes 73a and 73b may be detached from the arms 6a and 6b.

Even if the speed-reducing unit 13 or the bearing unit 16 is dismounted from the trolley body 4, the trolley body 4 remains supported by means of the spacer and the arms 6a and 6b on the upper rail portion 5A of the guide rail 5 and also the positioning guide rollers 8 and 9 keep vertically binding the respective rail portions 5A and 5B of the guide rail 5. Accordingly, there is no possibility that the trolley body 4 inadvertently falls off the guide rail 5 or has its position changed.

After the maintenance operation is completed, the speed-reducing unit 13 or the bearing unit 16 is mounted on its predetermined position on the upper portion of the trolley body 4 and is fixed thereto by means of the bolts. Then, the spacer inserted between the arms 6a and 6b and the upper rail portion 5A of the guide rail 5 is withdrawn therefrom and the drive wheel 15 and the driven wheel 18 are again placed onto the upper rail portion 5A.

Further, if there are provided bolts vertically adjustable relative e.g. to the arms 6a and 6b at positions opposed to the upper rail portion 5A of the guide rail 5 such that the arms 6a and 6b may be lifted up relative to the upper rail portion 5A of the guide rail 5 by lowering the bolts, there is no need to insert the spacer between the arms 6a and 6b and the upper rail portion 5A. Further, it is also possible to detachably attach the arms 6a and 6b to the trolley body 4. Also, in the previous embodiment, the arms 6a and 6b for pivotably supporting the positioning guide roller 8 serve also to support the trolley body 4 on the guide rail 5 in the maintenance operation. In place of this arrangement, it is also possible to provide, independently of the arms 6a and 6b for pivotably supporting the positioning guide roller 8, an arm for supporting the trolley body 4 on the guide rail 5 in the maintenance operation. In this case, it is possible to adapt this arm to be detachable and to detach the same when unnecessary.

As described above, according to the present invention, unlike the prior art, it is not necessary to dismount the entire trolley from the guide rail and also it is not necessary to carry out the maintenance or checking operations of the motor, the speed-reducing unit or of the bearing unit with the trolley being supported by the guide rail. As the result, the such operations may be carried out very efficiently and safely.

Further, according to the conveyor trolley of the present invention, of the lines connecting between the collector unit and the control panel, the intermediate wiring portion may be fixedly provided inside the trolley body as the relay lines and only the short lines between the relay lines and the collector unit and those between the relay wires and the control panel are exposed to the outside. Accordingly, the trolley may achieve a neat outer appearence and also it becomes unnecessary to fix middle portions of the lines to the trolley body. Further, since the insertion type line connector means are employed for connecting the relay lines inside the trolley body, mounting and dismounting operations of the collector unit or of the control panel may be carried out very efficiently. The stopper member for fixing the collector unit inserted at the predetermined position may be formed differently also. For example, the stopper member may be constructed such that the stopper member automatically stops the collector unit upon insertion of the same to the predetermined position and only the stop release operation thereof is effected manually. For instance, for detaching the collector unit from the trolley body, the lines continuously extending from the collector unit are disconnected via the insertion type line connector means and the stopper member is released and then the collector unit may be easily dismounted from the trolley body.

Therefore, the maintenance operation of the collector unit may be carried out very easily by dismounting the same from the trolley body. Also, after the maintenance operation, the collector unit may be also readily mounted again at the predetermined position. As the result, the maintenance operation of the collector unit may be effected extremely easily and efficiently.

Moreover, since the collector unit has the front and rear pair of collector elements coming into sliding contact with the same power supply and control signal lines, the lines from the pair of collector elements may be connected via the insertion type line connector means to the relay lines inside the trolley body thereby electrically connecting these collector elements each other inside the trolley body. As the result, the external wiring may be simplified.

Further, since the control panel is attached to the outer side of the power trolley mounting the collector unit, the wiring between the collector unit and the control panel and that between the control panel and the motor are not subjected to thrust force when the trolley travels at the horizontal curved passage portion. Thus, the wirings will have a longer life. Also, since the portion of the wiring between the control panel and the collector unit is provided inside the concave portion of the trolley body and also this concave portion is covered with the control panel, only the small length of the wiring is exposed to the outside thereby providing a neat appearence to the trolley. And, this will further extend the life of the wiring. Lastly, in comparison with an arrangement which requires another cover plate for covering the concave portion of the trolley body, the above arrangement of the present invention will serve to reduce the number of components thereby achieving a cost reduction.

What is claimed is:

1. A conveyor trolley having a pair of wheels rolling on a flat upper face of an upper end rail portion of a guide rail, one wheel acting as a drive wheel and attached to an output shaft extending directly from a speed-reducing unit mounted on a trolley body movably supported on the guide rail, and a motor for driving the output shaft via a speed-reducing mechanism in the speed-reducing unit, comprising:

a collector unit for supplying power to and communicating control signals with the motor;

guide rollers for laterally binding and positioning an upper rail portion and a lower rail portion of the guide rail;

wheel securing means disposed between an annular concave portion defined in a boss of the wheels and the shafts; said wheel securing means including, an outer ring, an inner ring having a wedge-shaped cross section to be engaged into said outer ring, and a tightening member for securing said wheels to the output shaft by reducing an inner diameter of said inner ring and by enlarging an outer diameter of said outer ring, a clutch removably disposed between said output shaft of said speed-reducing unit and a final rotary member of said speed-reducing unit loosely mounted on said output shaft, said clutch being movable relative to an axial direction of said output shaft while having its movement restricted relative to a rotational direction of said output shaft thereby to engage and disengage said output shaft with and from said final rotary member;

an operational lever attached to said clutch for engaging and disengaging the same by moving said clutch along the axial direction of said output shaft; and a first and a second bearing for rotatably supporting said output shaft from opposed sides of said final rotary member of the speed-reducing unit and said clutch.

2. A conveyor trolley as defined in claim 1, wherein said clutch includes clutch locking means for locking the clutch at an engaged or disengaged position thereof.

3. A conveyor trolley as defined in claim 2, wherein said clutch locking means includes a concave portion defined circumferentially in a circumference of a rotary shaft supported by a speed-reducing unit casing housing said speed-reducing unit normal to said output shaft and a lock bolt having a leading edge thereof engageable with said concave portion.

4. A conveyor trolley as defined in any one of claims 1 through 3, wherein said collector unit is dismountably mounted to said trolley body and is placed in sliding contact with power supply and control signal lines attached to a side of said guide rail.

5. A conveyor trolley as defined in claim 4, wherein lines extending from said collector unit are connected via first inserting type connector means to relay lines extending from said trolley body and said relay lines are connected via second inserting type connector means to lines extending from a control panel.

6. A conveyor trolley as defined in any one of claim 1, wherein said guide rail movably supports a power trolley having said motor and said drive wheel driven by said motor and a free trolley connected to said power trolley.

7. A conveyor trolley as defined in claim 6, wherein said collector unit is disposed inside said power trolley of said trolley body and said control panel is disposed outside said trolley body and a portion of lines connecting between said collector unit and said control panel is disposed inside a concave portion defined in an outer face of said trolley body with said concave portion being covered by said control panel.

8. A conveyor trolley as defined in any one of claim 7, wherein said trolley body further includes a pair of arms extending cantilever-wise therefrom to be substantially superposed on said guide rail.

* * * * *